United States Patent
Ueda et al.

[11] Patent Number: 5,482,412
[45] Date of Patent: Jan. 9, 1996

[54] CUTTING TOOL

[75] Inventors: Yoshihisa Ueda; Syouji Takiguchi; Akira Kanaboshi, all of Yuuki; Takehiro Ohnishi, Tottori, all of Japan

[73] Assignee: Mitsubishi Materials Corporation, Tokyo, Japan

[21] Appl. No.: 241,859

[22] Filed: May 12, 1994

[30] Foreign Application Priority Data

May 13, 1993 [JP] Japan .................................. 5-111926

[51] Int. Cl.⁶ .................................................. B23B 41/06
[52] U.S. Cl. .............................. 408/36; 408/42; 408/118; 408/158
[58] Field of Search ........................... 408/3, 118, 83.5, 408/153, 147, 158, 197, 713; 407/36–39, 73, 76, 77, 88, 92, 94, 98

[56] References Cited

U.S. PATENT DOCUMENTS

| | | | |
|---|---|---|---|
| 1,681,675 | 8/1928 | Miller | 407/36 |
| 2,571,944 | 10/1951 | Reimschissel et al. | 408/158 |
| 3,946,474 | 3/1976 | Hahn et al. | 407/37 |
| 4,692,074 | 9/1987 | Smith et al. | 408/36 |
| 5,044,841 | 9/1991 | Biera et al. | 408/158 |

*Primary Examiner*—Steven C. Bishop
*Attorney, Agent, or Firm*—Armstrong, Westerman, Hattori, McLeland & Naughton

[57] ABSTRACT

A slider 16 having a cutting insert 5A is slidably mounted in a groove 11 formed along the generatrix dimension of a substantially conical tool body 1. Serrations 12 and 16a, which are brought into close contact with each other for engagement, are formed on one side surface 11a of the groove 11 and on one side surface of the slide 16 opposite thereto. A wedge member 13 is detachably mounted between the other side surface 11b of the groove 11 and the slider 16 and is pressed against the side surface 11a so as to cause the serrations 12 and 16 to be engaged with each other. No special shaping accuracy is needed for the groove 11 or the slider 16 since any shaping error in these members can be absorbed so that a sufficient mounting accuracy is ensured for the slider 16. Thus, it is possible to reduce the requisite labor, etc. for the shaping of these members while maintaining the requisite positional accuracy for the cutting insert 5A.

1 Claim, 3 Drawing Sheets

CUTTING TOOL

BACKGROUND OF THE INVENTION

1. Field of the Invention

The present invention relates to a cutting tool which is most suitable for use, for example, in machining a valve hole in an engine cylinder head.

2. Description of the Related Art

In a valve hole in a cylinder head, the associated valve frequently abuts the peripheral edge (the opening section) of the hole. In view of this, a hard member made of sintered alloy or the like is fitted into the opening section of the hole to impart the requisite durability to it. Accordingly, to machine such a valve hole, a cutting tool is used which is equipped with cutting inserts for working on the edge of the hole as well as a reaming tool, such as a gun reamer, for finishing the hole itself. Further, in many cases, the peripheral edge portion of the valve hole has a tapered surface so as to be in conformity with the configuration of the associated valve head. To form such a tapered surface, it is desirable for the cutting inserts to be mounted in such a way as to be slidable along a dimension oblique to the axis of rotation of the cutting tool.

FIGS. 5 and 6 show an example of a conventional cutting tool used for the machining of such valve holes.

Referring to the drawings, a tool body 1, which has a substantially conical configuration, is attached, for example, to the spindle end of a machine tool (not shown) to be used for machining, through the intermediation of an adaptor 2, and is rotated around an axis 0 of the machine tool. Further, a bush 3 extending along the axis 0 is fitted onto the front end section of the tool body 1. The shank of a reaming tool, such a gun reamer (not shown), is fitted into the bush 3, so that by advancing this reaming tool while rotating the entire tool body 1, the valve hole can be machine-finished. The advancement of the reaming tool is effected by means of a shaft 4 which is coaxially inserted into a slide shaft described below.

Three cutting inserts 5A, 5B and 5C are provided around the front end section of the tool body 1. By means of the cutting inserts 5, the above-mentioned hole edge portion of the valve hole can be machined. FIG. 5 only shows one cutting insert 5A, the other two cutting inserts 5B and 5C being omitted in the drawing.

The two cutting inserts 5B and 5C are directly fastened to the tool body 1, whereas the cutting insert 5A is slidably mounted thereon. The cutting insert 5A is detachably fastened to a slider 7, which is slidably fitted into a T-shaped groove 6, as shown in FIG. 6, which T-shaped groove is formed in the tool body 1, along the generatrix dimension of the tool body's conical shape, i.e., along a dimension oblique to the axis 0.

The tool body 1 and the adaptor 2 have holes 1a and 2a, respectively, which extend along the axis 0. A slide shaft 8 and a coupling member 9 are inserted into the holes 1a and 2a. The coupling member 9 is fitted into the hole 1a through the intermediation of key 9a, whereby the tool body 1 and the coupling member 9 can integrally rotate around the axis 0. Further, by advancing or retracting the slide shaft 8, the coupling member 9 can advance or retract within the hole 1a. The T-shaped groove 6 and the hole 1a of the tool body 1 communicate with each other through a hole 6a provided at the bottom of the T-shaped groove 6. The slider 7 is equipped with a connecting pin 10, which extends through the hole 6a to protrude into the hole 1a. The tip of the connecting pin 10 is fitted into an oblique hole 9b formed in the coupling member 9, whereby the slider 7 and the coupling member 9 are coupled to each other. Thus, by advancing or retracting the slide shaft 8 together with the coupling member 9, the slider 7 slides along the T-shaped groove 6, thereby causing the cutting insert 5A to slide along a dimension oblique to the axis 0.

To form a valve hole by using this cutting tool, constructed as described above, a reaming tool, such as a gun reamer, is attached to the bush 3, and drawn toward the base end of the tool body 1 by drawing back the shaft 4. Then, the tool body 1 is rotated and, at the same time, fed along the axis 0, whereby the opening edge portion of the valve hole is chamfered by the two cutting inserts 5B and 5C. Subsequently, the tool body 1 is first slightly retracted, and then slide shaft 8 and the coupling member 9 are advanced while rotating the tool body 1, whereby the cutting insert 5A is caused to slide together with the connecting pin 10 and the slider 7, thereby forming a tapered surface as mentioned above on the peripheral edge portion of the valve hole. After this, the reaming tool is advanced by advancing the shaft 4 while rotating the tool body 1, thereby finishing the interior (the valve guide hole) of this valve hole.

PROBLEMS SOLVED BY THE PRESENT INVENTION

In the above-described cutting tool, the positioning of the cutting insert 5A is effected through the engagement of the T-shaped groove 6 with the slider 7, so that positioning accuracy depends on the shaping of the T-shaped groove 6 and the slider 7. Any errors in the shaping of these components cannot be compensated for afterwards. Thus, to attain a high level of machining precision with this cutting tool, it is necessary to machine the T-shaped groove 6 and the slider 7 with a high precision, and to accurately engage them with each other, thus, resulting in a lot of labor being required.

Further, there is a limit to the mounting rigidity of the slider 7. That is, the slider 7 is not free from rattling, which constitutes one of the factors causing deterioration in machining precision.

SUMMARY OF THE INVENTION

The present invention has been made with a view toward solving the above problems in the prior art. In accordance with the present invention, there is provided a cutting tool comprising: a substantially conical tool body rotatable around an axis; a groove formed along the generatrix dimension of this conical tool body and having first and second side surfaces that are opposite to each other and a bottom surface; a slider having a cutting insert and mounted in the groove so as to be slidable therein; and a coupling member which is mounted in the tool body in such a way as to be integrally rotatable with the tool body and capable of being advanced and retracted along the axis and which is engaged with the slider so as to cause the slider to slide, wherein the first side surface of the groove and a side surface of the slider facing the first side surface have serrations which can be brought into close contact with each other for engagement and which extend along the generatrix dimension, and wherein a wedge member is detachably mounted between the second side surface of the groove and the slider, the wedge member being forced in the groove toward the bottom surface thereof and pressed against the slider, causing the slider to be pressed against the first side wall so as to bring the serrations into engagement with each other.

In this cutting tool, constructed as described above, the wedge member, which is arranged between the second side surface of the groove and the slider, is forced in, whereby the slider is pressed against the first surface of the groove, with the result that the serrations formed on the slider abut against those formed on the first side wall, thereby effecting the positioning of the slider and the cutting insert. Thus, any shaping errors in the slider and the groove are acceptable provided they are not too great, thereby reducing the requisite labor for the shaping of these members. Further, due to the increased contact between the slider and the groove, which is effected through engagement between the serrations formed on them, the mounting rigidity for the slider can be improved, thereby preventing the slider from making rattling movements, etc. in the tool body.

BRIEF DESCRIPTION OF THE DRAWINGS

Preferred embodiments of the invention are illustrated in the attached drawings, in which.

DETAILED DESCRIPTION OF THE PREFERRED EMBODIMENTS

Figure 1:
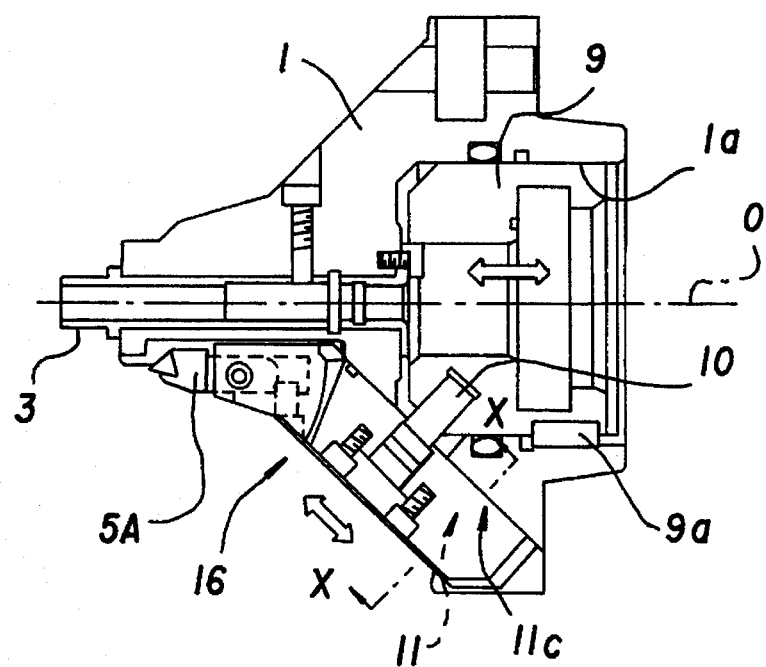
FIG. 1 is a sectional view showing a first embodiment of the present invention.
Figure 2:
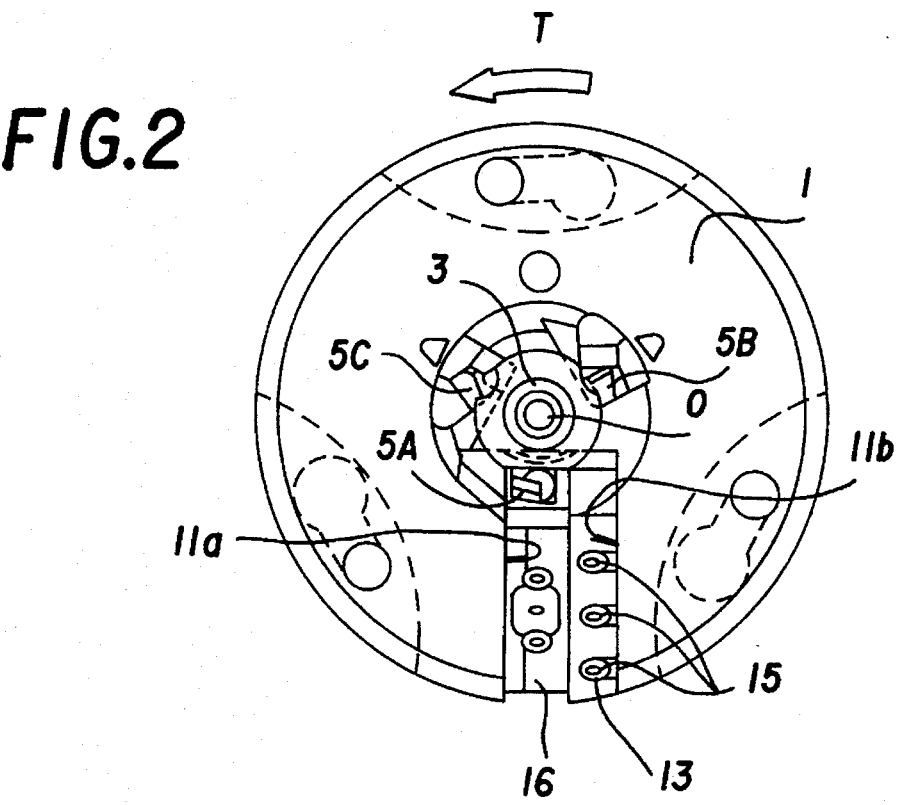
FIG. 2 is a front view of the embodiment shown in FIG. 1.
Figure 3:
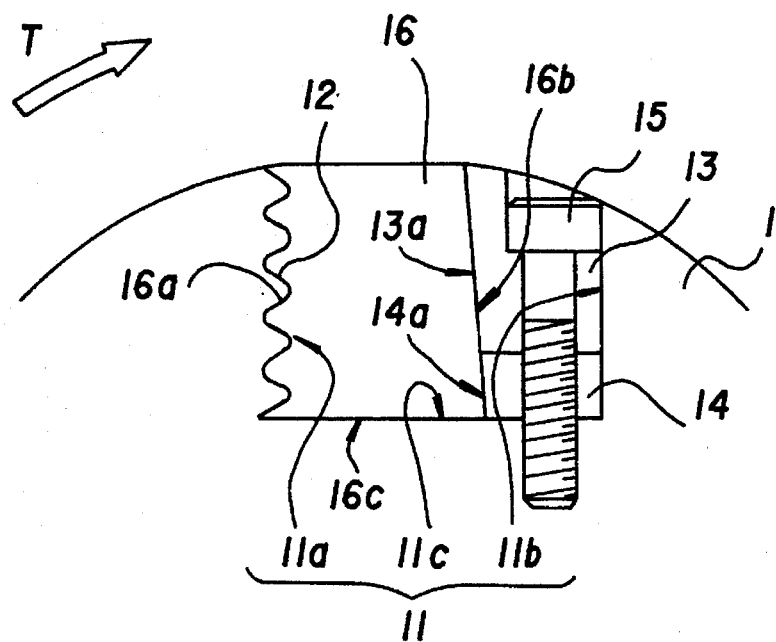
FIG. 3 is a sectional view taken along the line X—X of the embodiment shown in FIG. 1.
Figure 5:
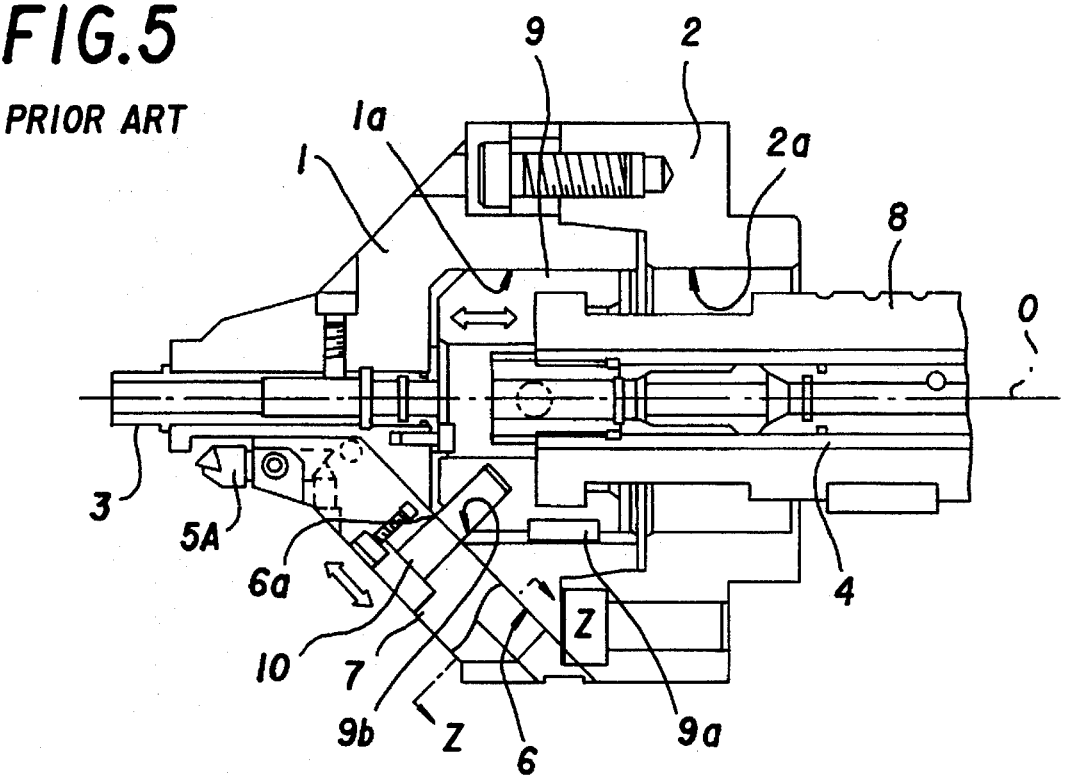
FIG. 5 is a sectional view showing a conventional cutting tool.
Figure 6:
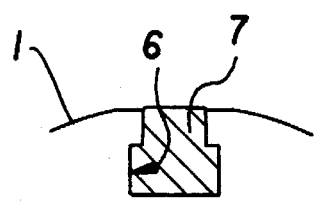
FIG. 6 is a sectional view taken along the line Z—Z of the conventional cutting tool shown in FIG. 5.

FIGS. 1 through 3 show an embodiment of the present invention. This embodiment has the same basic construction as the conventional cutting tool shown in FIG. 5, so that those components of this embodiment which are the same as those of the conventional cutting tool are indicated by the same reference numerals, and only a short description of such components will be given. Further, in these drawings, the adaptor 2, the shaft 4, and the slide shaft 8 are omitted.

Instead of the T-shaped groove 6 formed in the tool body 1 of the conventional cutting tool, this embodiment includes a groove 11, which is defined by a pair of opposed side surfaces 11a and 11b, parallel to each other, and a bottom surface 11c, perpendicular to the side surfaces 11a and 11b. The groove 11 extends along the generatrix dimension of the tool body 1, which has a substantially conical configuration. Regarding the position of the sides of the groove in relation to the movement of the tool, i.e., the direction of rotation T of the tool (which is counterclockwise as seen in FIG. 2), the side surface 11b leads and the side surface 11a follows. The side surface 11a has serrations 12, whereas the other side surface 11b, which is on the leading side with respect to the direction of rotation T of the tool, is in contact with a wedge member 13 which is detachably mounted in the groove 11 by clamp screws 15 through the intermediation of an adjusting member 14.

A slider 16, which is slidable along a dimension of the generatrix, i.e., a dimension oblique to the axis 0, is fitted into the gap defined by the side surface 11a, a side surface 13a of the wedge member 13, a side surface 14a of the adjusting member 14, and the bottom surface 11c.

The serrations 12, formed parallel to the generatrix, have a wave-shaped cross sectional configuration, and extend over the entire length of the groove 11.

The wedge member 13 and the adjusting member 14 are also formed so as to extend over the entire length of the groove 11 when fitted into the tool body 1. The wedge member 13 is arranged nearer to the outer periphery of the tool body 1 than the adjusting member 14, which is arranged on the bottom surface 11c of the groove 11. Both the wedge member 13 and the adjusting member 14 are in close contact with the other side surface 11b of the groove 11. Those side surfaces 13a and 14a of the wedge member 13 and the adjusting member 14, which are on the leading side with respect to the direction of rotation T of the tool, are flush with each other, and inclined toward the side surface 11b in proportion to the distance to the bottom surface 1c.

As shown in FIG. 1, the slider 16 is formed as a prism-like member which is bent into a V-shape, the base end section of which is arranged insider the groove 11, and the front end section of which has the cutting insert 5A detachably mounted thereon.

Serrations 16a having a wave-shaped cross-sectional configuration are formed on that surface of the base end section of the slider 16 which faces the side surface 11a of the groove 11 when the slider 16 is mounted on the tool body 1. The serrations 16a and the above-mentioned serrations 12 are in close contact with each other. On the other hand, that surface of the base end section of the slider 16 which faces the other side surface 11b of the groove 11 is formed as a surface 16b which is inclined so as to be farther away from the serrations 16a proportionally to the distance to the bottom surface 11c of the groove 11, in conformity with the inclination of the surfaces 13a and 14a of the wedge member 13 and the adjusting member 14.

As shown in FIG. 3, the slider 16 is slidably fitted into the above-mentioned gap, with its serrations 16a engaged with the serrations 12 of the side surface 11a of the groove 11 and its surface 16b in close contact with the surfaces 13a and 14a of the wedge member 13 and the adjusting member 14. Further, its bottom surface 16c is in close contact with the bottom surface 11c of the groove 11.

Like the above-described conventional tool, the cutting tool of this embodiment includes three cutting inserts 5A, 5B and 5C, of which the cutting insert 5A is attached to the slider 16 so that it is slidable. The other two cutting inserts 5B and 5C are fastened to the front end section of the tool body 1, as shown in FIG. 2. Thus, the three cutting inserts 5A, 5B and 5C are displaced from each other along the axis 0 of the tool body 1, whereas, circumferentially, they are arranged at equal intervals.

Figure 4:
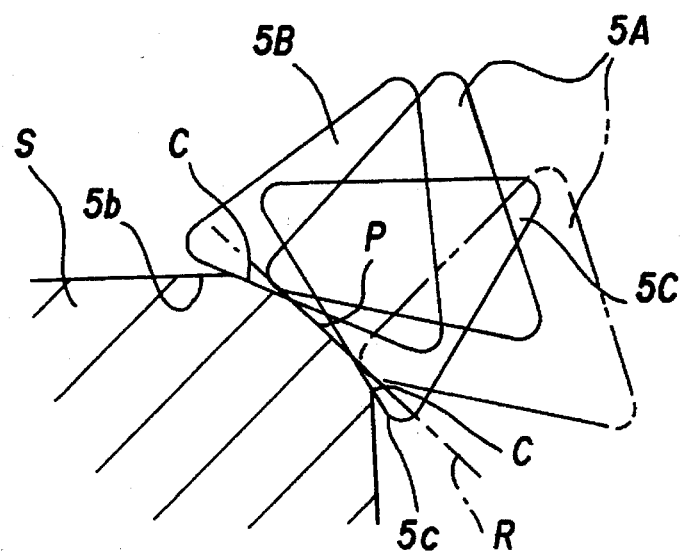
FIG. 4 is a diagram showing the loci of rotation around the axis 0 of the cutting inserts 5A, 5B and 5C in this embodiment.

FIG. 4 shows the loci of rotation around the axis 0 of the cutting inserts 5A, 5B and 5C. As shown in FIG. 4, the cutting inserts 5B and 5C are arranged in such a way that the loci of rotation of those cutting edge portions 5b and 5c, which are actually used for cutting, cross each other at obtuse angles. The cutting insert 5a is arranged in such a way that the locus R of the movement of its cutting edge portion 5a when the slider 16 slides during rotation, crosses the cutting edge portions 5b and 5c of the cutting inserts 5B and 5C at obtuse angles, at a position between these cutting edge portions 5b and 5c.

In this cutting tool, constructed as described above, the tool body 1, having a reaming tool, such a gun reamer, attached to its front end, is mounted on the spindle end of the associated machine tool through the intermediation of an adaptor or the like and is used for a cutting operation.

First, the tool body 1 is fed along the axis 0 while rotating around the axis 0, with the reaming tool drawn toward the base end of the tool body 1, to chamfer the opening section of a valve hole or the like as indicated at symbol C, as shown in FIG. 4. Symbol S indicates a hard member of sintered alloy or the like, which is fitted into the peripheral edge (opening) section of this valve hole, as stated above.

After the chamfering, indicated at C, the tool body 1 is first slightly retracted while rotating it, and then a slide shaft (not shown) is thrust forward to advance the coupling member 9, whereby the slider 16 is caused to slide together with the connecting pin 10 along the generatrix dimension of the substantially conical tool body, and the cutting insert 5A is caused to move along the above locus of movement R, thereby forming a tapered surface P in the opening section of the hole.

After this, the reaming tool, consisting of a gun reamer or the like, is advanced and inserted into the valve hole to finish the valve hole.

In the cutting tool described above, the wedge member 13 is forced in toward the bottom 11c of the groove 11 by the means of the clamp screws 15, whereby the slider 16 is pressed against the side surface 11a of the groove 11 by the inclined inner surface 13a of the wedge member 13, thereby causing the serrations 16a of the slider 16 to abut and engage the serrations 12 formed on the side surface 11a.

Thus, in accordance with this embodiment, it is possible for the serrations 12 and 16a to be securely engaged with each other even when the slider 16 and the groove 11 have some shaping errors and cannot be accurately and completely fitted with each other, provided the shaping errors are not too great. Such shaping errors can be absorbed by appropriately adjusting the degree to which the slider 16 is pressed by the surface 13a of the wedge member 13. This adjustment can be effected by adjusting, according to the nature of the shaping error, the depth to which the wedge member 13 is forced in the groove 11. Due to this arrangement, the requisite positional accuracy for the cutting inserts 5A can be ensured. Thus, with the above-described cutting tool, the groove 11 and the slider 16 may be formed with less shaping accuracy than in the conventional tool, thereby reducing the requisite labor, etc., for the shaping of these members.

Further, in this cutting tool, one side surface 11a of the groove 11 and the slider 16 are engaged with each other through the serrations 12 and 16a, which have a wave-shaped cross-sectional configuration and which can be brought into close contact with each other, so that when compared, for example, with the conventional cutting tool in which a slider engages a T-shaped groove, this cutting tool provides a larger contact area for the slider and the groove, thereby enhancing the mounting rigidity for the slider 16. Thus, the slider 16 is free from rattling movements due to the load, etc. during cutting, so that the positional accuracy for the cutting insert 5A is further improved, thereby making it possible to conduct a more accurate cutting.

While the serrations 12 and 16a in this embodiment have a wave-shaped cross-sectional configuration, it is also possible for these serrations to have, for example a saw-tooth like cross-sectional configuration to achieve increased contact to ensure the requisite mounting rigidity for the slider 16.

Further, in this embodiment, by appropriately varying the thickness of the adjusting member 14, which is provided between the wedge member 13 and the bottom surface 11c of the groove 11, it is possible to easily and accurately adjust the degree to which the slider 16 is pressed by the wedge member 13. That is, by replacing the adjusting member 14 by one having a different thickness, the depth to which the wedge member 13 is forced in the groove 11 is changed, with the result that the position of the inclined side surface 13a of the wedge member 13, which is pressed against the slider 16, is changed while maintaining the same inclination thereof.

Thus, due to this arrangement in accordance with this embodiment, any shaping errors in the groove 11 and the slider 16 can be absorbed even more easily by replacing the adjusting member 14 by an appropriate one, whereby the requisite mounting rigidity for the slider 16 and the requisite positional accuracy for the cutting insert 5A can be ensured, and the slider 16 can slide smoothly.

As described above, in accordance with the present invention, the slider is pressed against one side surface of the groove to engage the serrations, formed on both the slider and the side of the groove, whereby it is possible to absorb any shaping errors in the groove and the slider and to ensure a sufficient mounting rigidity for the slider, so that no special shaping accuracy is required for the groove and the slider. Thus, it is possible to reduce the requisite labor, etc., for the shaping of these members while maintaining the requisite positional accuracy for the cutting insert. In addition, due to increased contact between the slider and the groove, the mounting rigidity of the slider is enhanced, so that the slider is free from rattling movements due to the cutting load, etc., thereby further improving the positional accuracy for the cutting insert.

Furthermore, due to the provision of the adjusting member between the wedge member and the bottom surface of the groove, it is possible for any shaping errors in the groove and the slider to be coped with even more easily.

It will be apparent to those skilled in the art that the embodiments described may be varied, such as to meet particular specialized requirements, without departing from the true spirit and scope of the invention as claimed.

What is claimed is:

1. A cutting tool comprising:

a substantially conical tool body rotatable around an axis; a groove formed along a generatrix dimension of said conical tool body and having first and second side surfaces that are opposite to each other and a bottom surface; a slider having a cutting insert and which is mounted in said groove so as to be slidable therein; and a coupling member which is mounted in said tool body such as to be integrally rotatable with said tool body and which is capable of being advanced and retracted along said axis and which is engaged with said slider so as to cause said slider to slide, wherein the first side surface of said groove and a side surface of said slider facing said first side surface each have serrations which can be brought into close contact with each other for engagement and which extend along said generatrix dimension, and wherein a wedge member is detachably mounted between the second side surface of said groove and a slider, said wedge member being forced in said groove toward the bottom surface thereof and pressed against said slider, causing said slider to be pressed against said first side wall so as to bring said serrations into engagement with each other; and further comprising and adjusting member provided between said wedge member and the bottom surface of said groove which determines the depth to which said wedge member is forced in said groove so as to adjust the degree to which said slider is pressed against the first side surface of said groove.

* * * * *